Dec. 31, 1940.   L. E. LIPSCHULTZ   2,226,866
STEERING WHEEL COVER AND METHOD OF FORMING THE SAME
Filed July 16, 1938

Inventor
Louis E. Lipschultz

Attorney

Patented Dec. 31, 1940

2,226,866

UNITED STATES PATENT OFFICE 2,226,866

STEERING WHEEL COVER AND METHOD OF FORMING THE SAME

Louis E. Lipschultz, St. Paul, Minn.

Application July 16, 1938, Serial No. 219,590

2 Claims. (Cl. 74—558)

My invention relates to an improvement in steering wheel covers wherein it is desired to provide a device of this type which will not slip upon the steering wheel and which is formed of loosely woven fabric material.

During recent years a number of different types of steering wheel covers have been formed which have been designed to inclose the wheel. These covers were first designed for use in cold weather where the material was not as cold to touch as the body of the wheel itself. Most of these covers have been removed in the summer time because the fabric from which they have been formed was a heavy fabric which was warm to touch. A more loosely woven fabric material was tried to provide a cover for summer use, but it was found that this material slipped easily over the surface of the wheel.

It is a purpose of the present invention to provide a steering wheel cover formed of loosely woven textile material and having on one side thereof a surface of rubber, which rubber is impregnated into the body of the loosely woven fabric and conforms to a large extent to the contour of the threads from which the material is woven. When this material was constructed, it was found that the rough surface of the fabric when coated with rubber, created a continuous surface of tiny suction cups which firmly engaged the surface of the wheel and therefore prevented slipping of the cover with respect to the wheel.

It is the object of the present invention to provide a steering wheel cover formed of loosely woven fabric or the like, which provides an uneven surface over which rubber or the like may be coated. This uneven surface creates a similar uneven surface on the rubber which creates suction pockets to firmly engage the smooth surface of the steering wheel and prevent relative rotation between the wheel and the cover.

It is a further feature of my invention to provide a steering wheel cover formed of fabric formed of relatively loosely woven material which presents an uneven surface to the person handling the wheel, thereby providing a construction which is cooler to handle than a pile fabric or a mohair type of material having a soft relatively smooth outer surface into which the fingers and hand are impressed in grasping the wheel.

These and other objects and novel features of my invention will be more clearly and fully set forth in the following specification and claims.

In the drawing forming a part of my specification:

Figure 1:
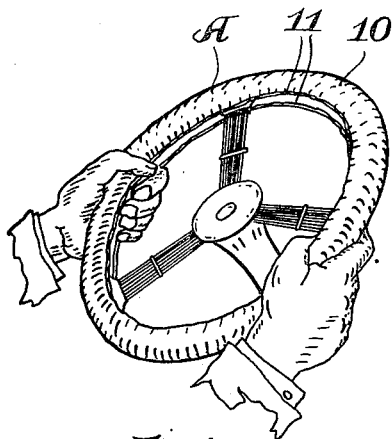
Figure 1 is a perspective view of a steering wheel with my steering wheel cover in place thereupon.
Figure 2:
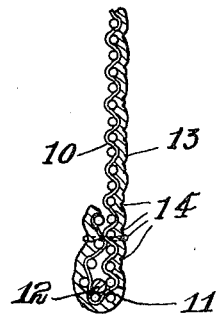
Figure 2 is a cross-section, through the material forming the cover, illustrating the manner in which the rubber coating follows the contour of the threads forming the surface of the material to create an uneven inner surface.

The steering wheel cover A comprises a strip of loosely woven fabric 10 forming the body of the same and having hemmed edges 11 within which edges are positioned a resilient or elastic cord 12 which tends to pull the edges of the fabric body 10 inwardly. The edges 11 are restricted in diameter, but the body 10 extends over the outer surface of the wheel. The cover may be readily inserted upon the wheel or removed therefrom by stretching one of the cords 12 within a hemmed edge 11 sufficiently to slip the body off the wheel.

The fabric body 10 is formed of loosely woven material which is uneven in thickness and which therefore is cool to hold within the hand. Due to the uneven surface of the fabric engaged by the hand, the surface of the hand only engages the fabric at points slightly spaced apart, permitting air to separate the hand from the cloth throughout a great portion of the area engaged.

This specific type of material used is a decided change from material ordinarily used in the formation of these covers as it has been common practice to utilize some type of pile fabric or mohair in constructing these covers. These former materials comprise a woven base having threads extending therethrough to provide a material somewhat simulating fur, as on one side of the material the threads all extend out at substantially right angles to the body of the material. It will be understood that when the hand engages such material the entire engaging surface of the hand is embedded down into the soft threads forming the outer surface of the material, and therefore little air is found between the hand and the material at any point and the hand is in reality embedded down into the soft material.

Figure 3:
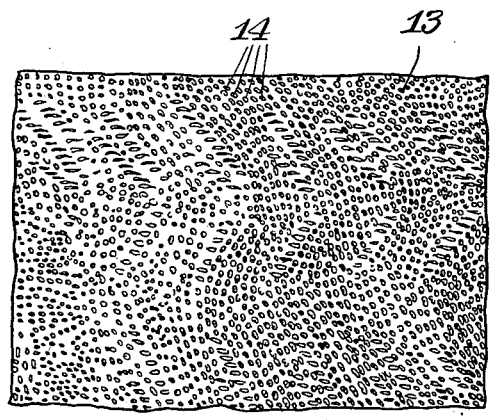
Figure 3 is a plan view of a section of the material coated with rubber, showing the uneven surface on the inner surface thereof.

The loosely woven material from which my cover is formed is provided with a rough inner surface as well as a rough outer surface. This rough inner surface is covered with a coating of rubber 13 or other similar material. After the rubber has been coated upon the cloth, the pattern of the cloth is readily visible in this rubber film, as may be seen in Figure 3 of the drawing.

The position of the various threads from which the material is formed is visible through the rubber as the rubber follows the contour of the threads which have been woven together.

The unbroken rubber film 13 thus provides a series of minute suction pockets 14 which engage the smooth surface of the steering wheel 15 and which cling to the wheel in such a manner that relative movement between the cover and the wheel is virtually impossible. It may be seen that with my construction a steering wheel cover is formed which is more comfortable to use in warm weather than any other type of cover and which is more positively secured to the surface of the wheel than any other type of cover with which I am familiar. The material may be designed to fit any size steering wheel and may be washed readily, and therefore kept clean. The cover keeps the hands dry and clean and therefore makes driving safer and more comfortable than with any previous cover.

In accordance with the patent statutes I have described the principles of construction of my steering wheel cover, and while I have endeavored to set forth the best embodiments thereof, I desire to have it understood that this is only illustrative of a means of carrying out my invention and that obvious changes may be made within the scope of the following claims without departing from the spirit of my invention.

I claim:

1. A steering wheel cover comprising a body of loosely woven flexible material, means at the free longitudinal edges of said body for holding said body on the steering wheel of a vehicle, and a coating of rubber over the inner surface of said body, following the contour of said loosely woven material.

2. A steering wheel cover comprising a body of loosely woven textile material having a regular rough inner surface thereupon, an endless pair of marginal elastic members for securing said body upon a steering wheel, and a thin coating of rubber upon the inner surface of said body following the contour of the inner surface to provide an inner surface of highly coefficient friction relative to the steering wheel surface.

LOUIS E. LIPSCHULTZ.